United States Patent
Park

(10) Patent No.: US 7,226,519 B2
(45) Date of Patent: Jun. 5, 2007

(54) FLEXIBLE HOSE FOR A VACUUM CLEANER AND FABRICATING METHOD THEREOF

(75) Inventor: Il-Sook Park, Yangsan (KR)

(73) Assignee: Sungkwang Best Co., Ltd. (KR)

( * ) Notice: Subject to any disclaimer, the term of this patent is extended or adjusted under 35 U.S.C. 154(b) by 558 days.

(21) Appl. No.: 10/706,649

(22) Filed: Nov. 12, 2003

(65) Prior Publication Data

US 2004/0096616 A1 May 20, 2004

(30) Foreign Application Priority Data

Nov. 12, 2002 (KR) ........................ 10-2002-0069879

(51) Int. Cl.
*B65H 81/00* (2006.01)
(52) U.S. Cl. ................. 156/195; 156/143; 156/244.11; 156/244.13
(58) Field of Classification Search ................ 156/195, 156/244.11, 143, 244.13
See application file for complete search history.

(56) References Cited

U.S. PATENT DOCUMENTS 4,383,555 A * 5/1983 Finley ........................ 138/129
5,601,119 A * 2/1997 Kanao ........................ 138/133

FOREIGN PATENT DOCUMENTS

JP          10-14834 A   *  1/1998
WO       WO-01/19601 A1 *  3/2001

* cited by examiner

*Primary Examiner*—Jeff H. Aftergut
(74) *Attorney, Agent, or Firm*—Keusey, Tutunjian & Bitetto, P.C.

(57) ABSTRACT

Disclosed is a flexible hose for a vacuum cleaner and a fabricating method thereof. The fabrication method includes the steps of: extruding a primary extrusion molding band 13 having a larger size than a size of a finished state while embedding an electric wire 1 in the primary extrusion molding band 13 at a first extruder 12; molding a multi-extrusion molding band 10 in the size of the finished state at a sizing mold 14; and winding the multi-extrusion molding band 10 at a predetermined angle at a bonder and bonding a bonding portion 2 of the electric embedding portion 3 with a bonding end 4 of the semicircular portions 5 positioned on both sides of the multi-extrusion molding band 10 by using adhesive 8.

5 Claims, 5 Drawing Sheets

FLEXIBLE HOSE FOR A VACUUM CLEANER AND FABRICATING METHOD THEREOF

BACKGROUND OF THE INVENTION

1. Field of the Invention

The present invention relates to a flexible hose for a vacuum cleaner, in which a long extrusion molding band is wound in a cylindrical form, and a fabricating method thereof, and more particularly, to a flexible hose for a vacuum cleaner, in which a multi-band extrusion molding is employed such that a plurality of extrusion molding bands are arranged in parallel and connected to one another, wound in a cylindrical form, and a fabricating method thereof is also included.

2. Description of the Prior Art

A flexible hose for a vacuum cleaner is made cylindrically by winding an extrusion molding band, which is extrusion-molded in a single line. The cross-section of the extrusion molding band may include a wave shape '∽'. One side of the cross-section may include an electric wire embedding portion and the other side may include a semicircle portion having a semicircle shape. When the extrusion molding band is wound in a cylindrical form so as to fabricate the flexible hose, the semicircle portion of the other side is folded on the electric wire embedding a portion of the one side and attaching to the electric wire embedding portion by an adhesive. Accordingly, the conventional flexible hose is made by bonding two lines of extrusion molding bands with an adhesive and winding the two lines of bonded and folded extrusion molding bands at the same time.

In other words, to fabricate a flexible hose of an extrusion molding having two bands, four extrusion motors (two motors for extruding extrusion molding bands and two bonding motors) are employed. The fabricating method includes the steps of cooling a first extrusion molding band molded out from a first extruder along with an embedded electric wire, fixing the first extrusion molding band dimensionally with a sizing mold simultaneously, drawing the first extrusion molding band with a cooling drawer, ascertaining the size of the first extrusion molding band, repeating the above-mentioned steps by operating a second extruder if the size is satisfactory, bonding the two extrusion molding bands by a first bonder if the extrusion molding bands have no problem in their shape, winding the two extrusion molding bands with a predetermined angle and bonding the two extrusion molding bands at the winding starting portions by using a second bonder simultaneously.

Alternatively, to fabricate a flexible hose with three lines of extrusion molding bands, six extrusion motors (two motors for extruding extrusion molding bands and two bonding motors) and three or four electric wires are needed. When using four electric wires, a danger of a short circuit may occur because two electric wires are inserted into any one of the three lines of extrusion molding bands. In this case, the fabrication method includes the steps of: cooling a first extrusion molding band molded out from a first extruder with an embedded electric wire and at the same time fixing the size of the first extrusion molding band using a sizing mold; drawing the first extrusion molding band using a cooling drawer; ascertaining the size of the first extrusion molding band; repeating the above-mentioned steps by operating a second extruder if the size is satisfactory; repeating the above-mentioned steps by operating a third extruder if the two extrusion molding bands have no problem in their shape; bonding the two extrusion molding bands by a first bonder if the extrusion molding bands have no problem in their size and shape; bonding the two bonded extrusion molding bands with another extrusion molding band by using a second bonder if the extrusion molding bands have no problem in their appearance size; winding the three bonded extrusion molding bands at a predetermined angle if there is no problem; and bonding the three extrusion molding bands at the winding starting portions by using a third bonder.

For conventional flexible hoses, the design is complicated in the coupling structure of the extrusion molding bands, so that the working efficiency is lowered. Since the flexible hose is bonded at many points by bond or resin, it is problematic in reliably fix the extrusion molding bands, therefore for the conventional flexible hoses the product reliability is low. Since there exist many bonding points, the pitch of the conventional flexible hose is not uniform and the failure ratio is high. In addition, since the bonding portion has joint surfaces on both sides, the flexibility of the flexible hose is lowered and its thickness is large so that too much source material is consumed.

In addition, for the conventional flexible hose, the extrusion molding band can be molded only in one line. So, if two or more extrusion molding bands are extruded and elongated to fix the size in a sizing mold, the semicircular portion may be adhered to an upper portion of the electric wire embedding portion.

SUMMARY OF THE INVENTION

Accordingly, the present invention is directed to a flexible hose for a vacuum cleaner and a fabricating method thereof that substantially obviates one or more problems due to the limitations and disadvantages of the related art.

An object of the present invention is to provide a flexible hose for a vacuum cleaner and a fabricating method thereof. The flexible hose having a good cross-section as if molded with one extrusion molding band although the extrusion molding band is elongated in a sizing mold by extruding the primary extrusion molding band drawn from the extruder whose cross-section is different from that of the related art, so as to prevent the cross-section of the multi-extrusion molding band from being deformed and the semicircular portion from being adhered to an upper portion of the electric wire embedding portion when a plurality of extrusion molding bands are pre-molded into one primary extrusion molding band and the primary extrusion molding band is fixed dimensionally in a sizing mold to draw a final multi-extrusion molding band.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of fabricating a flexible hose 9 for a vacuum cleaner by winding at a predetermined angle one long extrusion molding band 7 provided with a semicircular portion 5 and an electric wire embedding portion 3 connected to each other through one connector 6 and bonding at the same time. The method comprises the steps of: (a) extruding a primary extrusion molding band 13 having a larger size than a size of a finished state while embedding an electric wire 1 in the primary extrusion molding band 13 at a first extruder 12; (b) molding a multi-extrusion molding band 10 in the size of the finished state at a sizing mould 14; and (c) winding the multi-extrusion molding band 10 at a predetermined angle at a bonder and bonding a bonding portion 2 of the electric embedding portion 3 with a bonding end 4 of the semicircular portions 5 positioned on both sides of the multi-extrusion molding band 10 by using adhesive 8.

Preferably, the primary extrusion molding band 13 is extruded such that the plurality of semicircular portions 5 and the plurality of electric wires 3 are connected to each other through the connectors 6 to form integrated cross-sections and an upper portion of the semicircular portion 5 is thinner than the connectors 6.

According to the present invention, there is provided a flexible hose for a vacuum cleaner, comprising two or three long extrusion molding bands 7 having cross-sections each including an rectangular electric embedding portion 3 having an embedded electric wire 1 and a bonding portion 2, a semicircular portion 5 having a bonding end at an end thereof, and a connecter connecting the electric embedding portion 3 and an semicircular portion 5, wherein bonding ends 4 and the bonding portions 2 of the two or three long extrusion molding bands 7 are bonded through adhesive, the extrusion molding bands 7 are wound cylindrically at a predetermined angle, and the bonding end 4 of the extrusion molding band 7 positioned at one side and a bonding portion 2 of the extrusion molding band 7 positioned at the other side are bonded through adhesive, wherein one multi-extrusion molding band 10, which is molded in an integral type such that two or more semicircular portions 5 and two or, more electric wire embedding portions 3 are connected to each other through the connectors 6 as viewed in a cross-section, is wound cylindrically at a predetermined angle and the bonding end 4 at one side and a bonding portion 2 at the other side are bonded.

Desirably, an expansion hole 11 is formed at a portion where the semicircular portion 5 and an electric wire embedding portion 3 are connected to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 8:
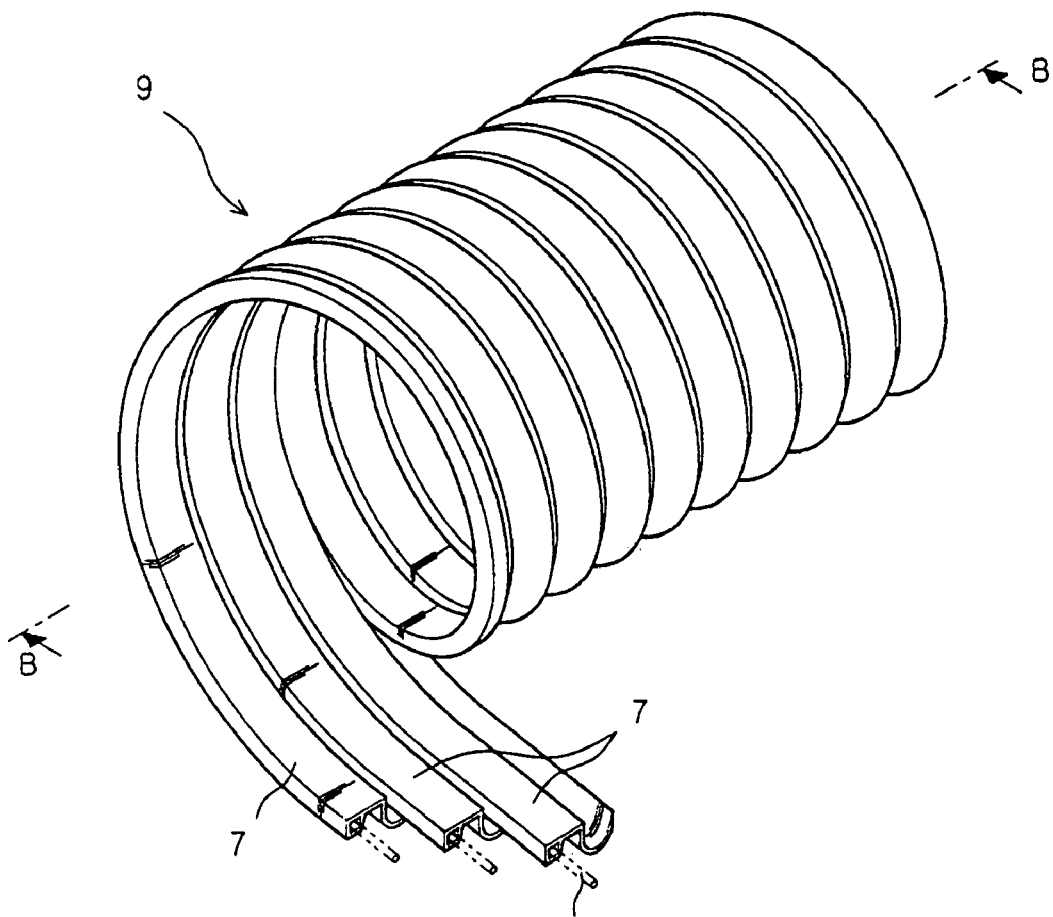
FIG. 8 is a perspective view illustrating a hose according to the related art.
Figure 9:
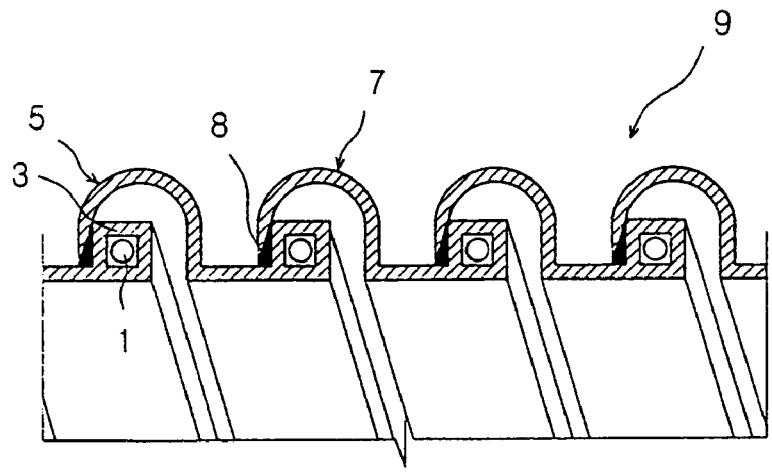
FIG. 9 is a cross-sectional view taken along the line B—B of FIG. 8.

Referring to FIGS. 8 and 9, in the related art, a flexible hose 9 for a vacuum cleaner includes two or three long extrusion molding bands 7 which are attached to each other and wound cylindrically at a predetermined angle. Each of the extrusion molding bands 7 has a cross-section configured to include a rectangular electric embedding portion 3 having an embedded electric wire 1 and a bonding portion 2, a semicircular portion 5 having a bonding end at an end thereof, and a connecter connecting the electric embedding portion 3 and the semicircular portion 5. Bonding ends 4 and bonding portions 2 of the two or three long extrusion molding bands 7 are bonded by an adhesive 8, and the bonding end 4 of the extrusion molding band 7 is positioned at one side and a bonding portion 2 of the extrusion molding band 7 is positioned at the other side are bonded by the adhesive 8.

Figure 1:
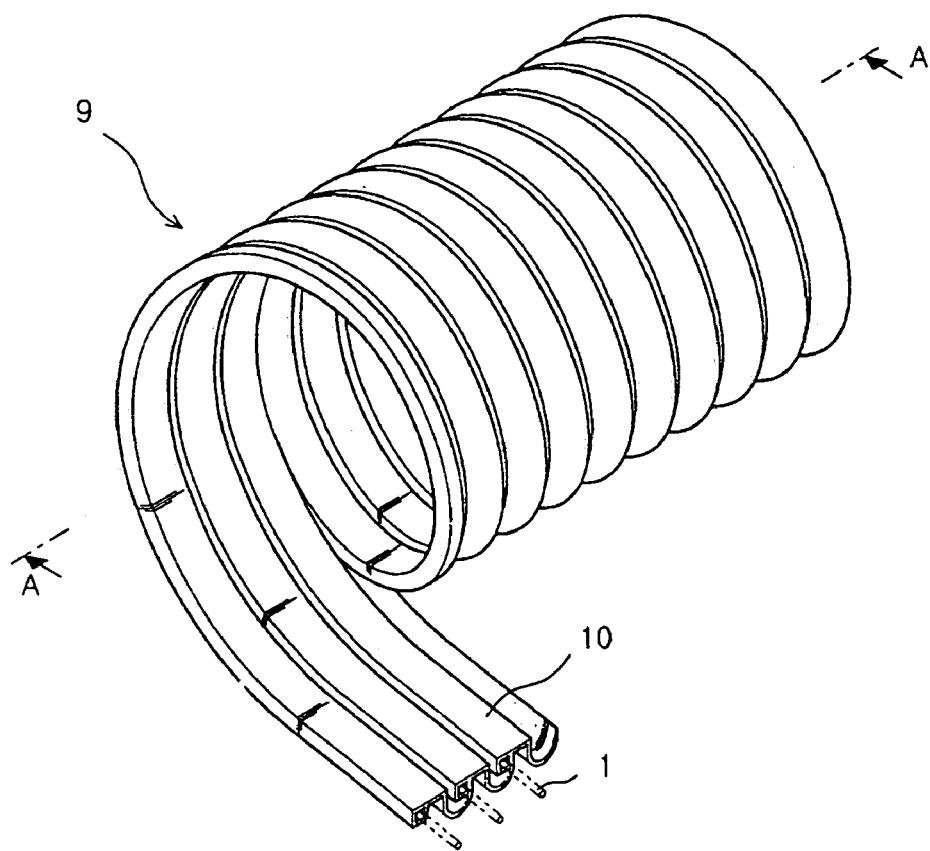
FIG. 1 is a perspective view illustrating a hose according to the present invention.
Figure 2:
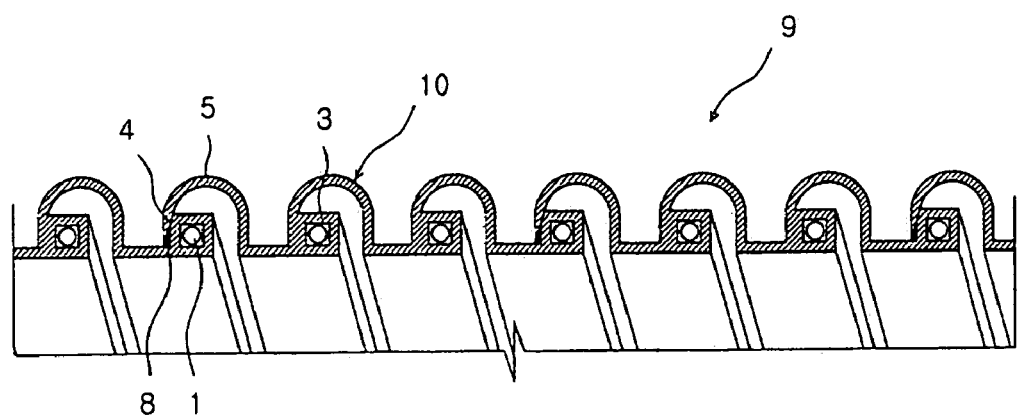
FIG. 2 is a cross-sectional view taken along the line A—A of FIG. 1.

In one embodiment of the present invention, as shown in FIGS. 1 and 2, the flexible hose 9 is configured to have one multi-extrusion molding band 10 molded in an integral form that two or more semicircular portions 5 and two or more electric wire embedding portions 3 are connected to each other through connectors 6. The multi-extrusion molding band 10 is wound cylindrically at a predetermined angle, and the bonding end 4 at one side and the bonding portion 2 at the other side are bonded by the adhesive 8.

An expansion hole 11 (FIG. 5) is formed at a portion where the semicircular portion 5 and an electric wire embedding portion 3 are connected to each other.

Figure 7:
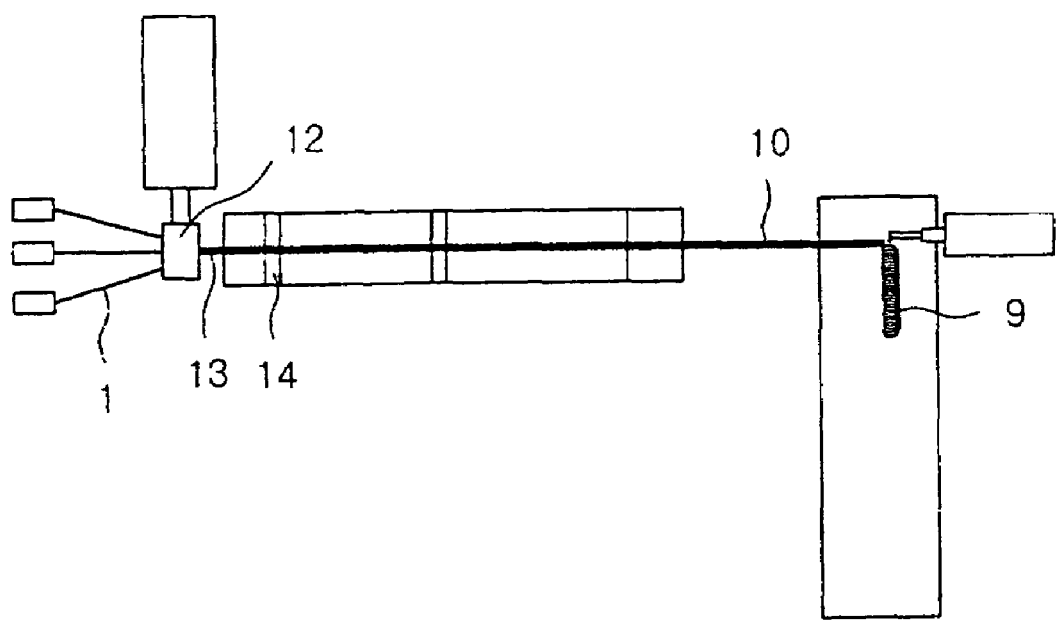
FIG. 7 is a schematic view illustrating equipment for a fabricating method according to the present invention.

Referring to FIG. 7, a flexible hose 9 of the present invention can be fabricated by the following steps.

Figure 6:
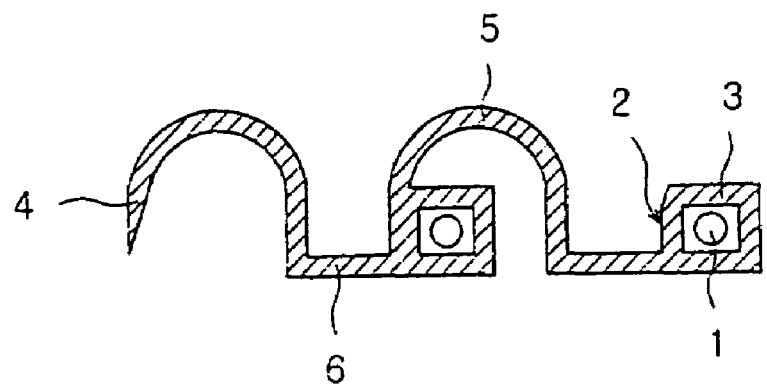
FIG. 6 is a cross-sectional view illustrating a multi-extrusion molding band according to another embodiment of the present invention.

A first step extrudes a big primary extrusion molding band 13 while embedding an electric wire 1 in the big primary extrusion molding band 13 at a first extruder 12 (FIG. 6). A second step molds a multi-extrusion molding band 10 in a size of a finished state at a sizing mold 14. A third step winds the multi-extrusion molding band 10 at a predetermined angle (FIG. 1) and bonds a bonding portion 2 of an electric embedding portion 3 with a bonding end 4 of the semicircular portions 5 positioned on both sides of the multi-extrusion molding band 10 by using an adhesive 8 (FIG. 2).

Figure 3:
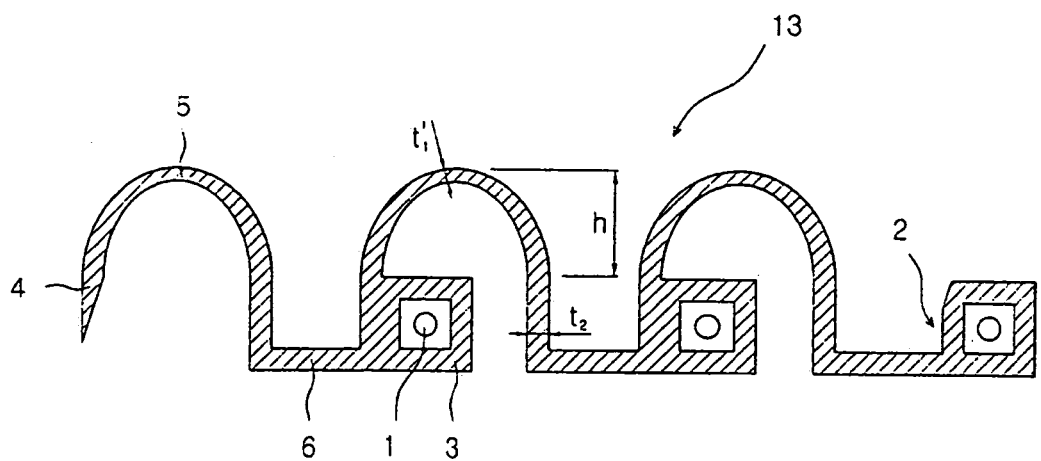
FIG. 3 is a cross-sectional view illustrating a primary extrusion molding band according to the present invention.

The primary extrusion molding band 13 and the multi-extrusion molding band 10 have an integrated cross-section where the plurality of semicircular portions 5 and the plurality of electric wires 3 are connected to each other through connectors 6. The primary extrusion molding band 13 is larger in size than the multi-extrusion molding band 10. Especially, as shown in FIG. 3, the primary extrusion molding band 13 is extruded such that the thickness t1 of the upper portions of the semicircular portions 5 is less than the thickness t2 of other portions such as connectors 6. Compared with the final multi-extrusion molding band 10, the primary extrusion molding band 13 is extruded such that t1, t2 and h is larger than t1', t2' and h' and consequently t1' and t2' are equal.

Compared with the conventional method, the inventive flexible hose 9 fabricated by the aforementioned method has a greatly decreased bonding defect since it has one bonding portion. Also, the flexible hose 9 has excellent workability and productivity. These advantages are made possible due to the characteristics of the fabricating process and the cross-sectional characteristics of the primary extrusion molding band 13.

Figure 10:
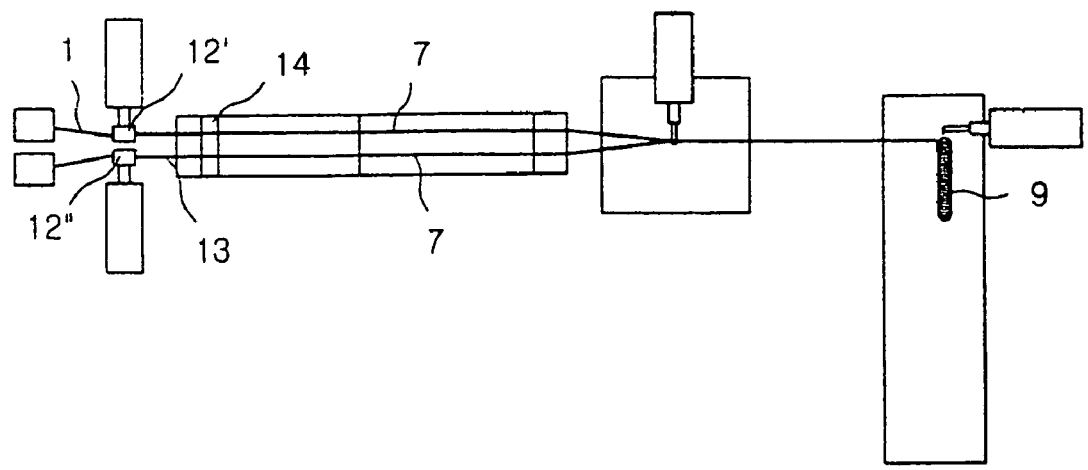
FIG. 10 is a schematic view illustrating equipment for a method fabricating a hose by using two extrusion molding bands according to the present invention.
Figure 11:
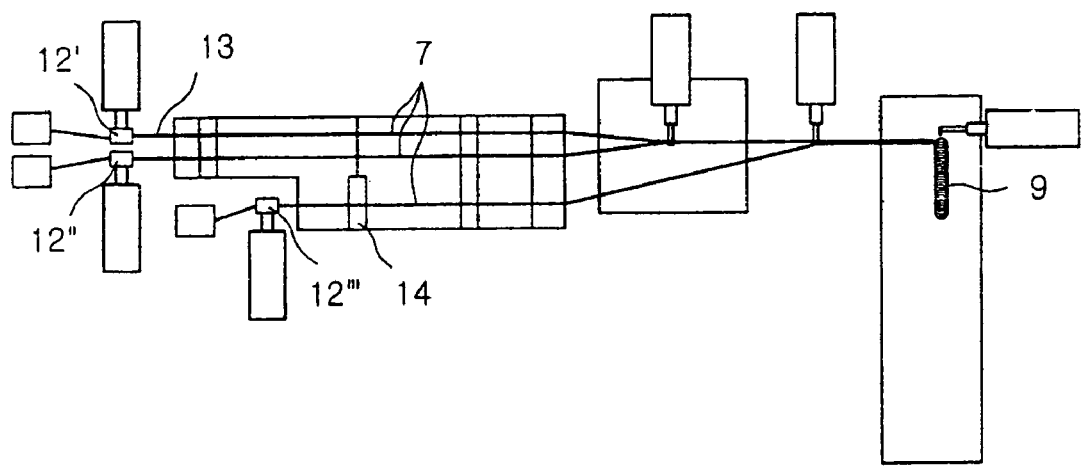
FIG. 11 is a schematic view illustrating equipment for a method fabricating a hose by using three extrusion molding bands according to the present invention.

Referring to FIGS. 10 and 11, the size ratio of outlets of a first extruder 12', a second extruder 12" and a third extruder 12'" which are used in the conventional fabrication method are configured equal to the size ratio of the outlets of the first primary extrusion molding band 13 and the extrusion molding band 7 of the sizing mold 14 with respect to all the portions. The large-sized first primary extrusion molding band 13 extruded from the first extruder 12' passes through the sizing mold 14 and is finally molded into the extrusion molding band 7 fixed at a designed size.

Accordingly, in order to fabricate the multi-extrusion molding band 10 as suggested above according to this fabrication method, when the primary extrusion molding band 13 extruded from the first extruder 12' passes through the sizing mold 14 and is finally molded into the extrusion molding band 7, the semicircular portion 5 may be adhered to the electric wire embedding portion 3. The present invention improves such an adhering problem, so that two or more extrusion molding bands 7 can be extruded into one multi-extrusion molding band 10.

In other words, according to the present invention, the problem of the conventional art is solved by making the cross-section of the primary extrusion molding band 13 bled by the extruder 12 as shown in FIG. 3.

Here, the primary extrusion molding band 13 is larger in size than the final multi-extrusion molding band 10. Especially, as shown in FIG. 3, t1 of the thickness of the upper portion of the semicircular portion 5 is less than t2 of the thickness of other portions such as the connector 6.

Figure 4:
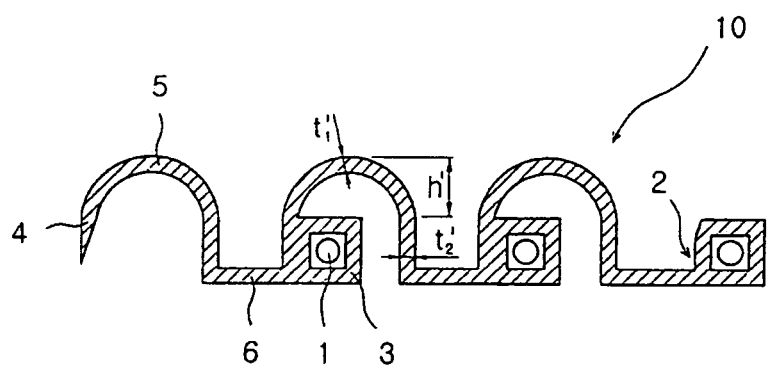
FIG. 4 is a cross-sectional view illustrating a multi-extrusion molding band according to an embodiment of the present invention.

Accordingly, in the first step, the big primary extrusion molding band 13 is extruded while the electric wire 1 is embedded in the big primary extrusion molding band 13 at the first extruder 12. In the second step, the multi-extrusion molding band 10 is molded to have the size of the finished state at the sizing mold 14 and the multi-extrusion molding band 10 is molded. By the second step, t1, t2 and h (FIG. 3) are changed into t1', t2' and h' (FIG. 4) respectively and consequently the final shape is made. Here, the semicircular portion 5 is prevented from being adhered to the electric wire embedding portion due to the thickness difference between t1 and t2 although each of them is molded to have t1' and t2'. In the third step, the multi-extrusion molding band 10 (FIG. 1). having the shape in which the plurality of conventional extrusion molding bands 7 is molded simultaneously is fabricated into the flexible hose 9 for a vacuum cleaner. The multi-extrusion molding band 10 is wound at a predetermined angle, and the bonding portion 2 of the electric embedding portion 3 is bonded with the bonding end 4 of the semicircular portions 5 positioned on both sides of the multi-extrusion molding band 10 by the adhesive 8. In the above second step, since the flexible hose 9 is fabricated by winding the multi-extrusion molding band 10 having a wide cross-section, the bonded area is reduced more compared with that of the conventional flexible hose. As a result, the problem of adhesion defect occupying most of the failure in quality is overcome and the more flexible hose 9 can be fabricated due to the reduction of the adhesion area.

Figure 5:
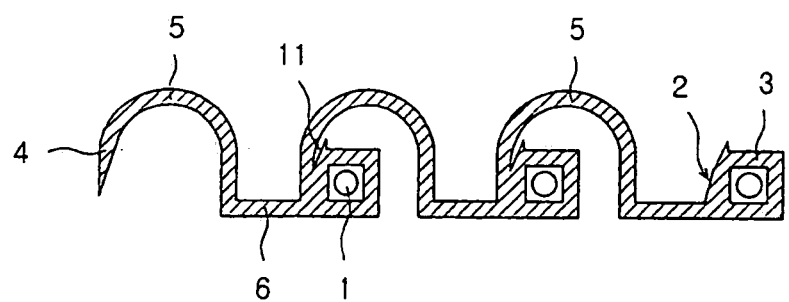
FIG. 5 is a cross-sectional view illustrating a multi-extrusion molding band according to another embodiment of the present invention.

The flexible hose 9 for a vacuum cleaner is bent very frequently during its use. To add more flexibility to the flexible hose of the present invention, an expansion hole 11 can be formed at a position where the semicircular portion 5 and the electric wire embedding portion 3 are connected to each other as shown in FIG. 5. Accordingly, the semicircular portion 5 can be moved as much as the area of the expansion hole 11, so that the flexibility of the flexible hose 9 is increased.

In the present invention, one primary extrusion molding band 13 including a plurality of extrusion molding bands connected to one another is pre-molded, the size of the primary extrusion molding band 13 is fixed at a sizing mold 14 and molded into a final multi-extrusion molding band 10, and the final multi-extrusion molding band 10 is wound cylindrically, so that the flexible hose is fabricated. The flexible hose 9 is fabricated using the multi-extrusion molding band 10 having a wide cross-section so that the failure ratio is reduced due to reduction of adhesion area, productivity is enhanced and the flexibility of the flexible hose is also enhanced during the use of a vacuum cleaner.

As illustratively shown in FIG. 6, band 10 may be fabricated in different sizes having a different number of repeating band patterns, e.g., a multi-extrusion molding band may include 2, 3, 4 etc. semicircular portions 5.

It will be apparent to those skilled in the art that various modifications and variations can be made in the present invention. Thus, it is intended that the present invention covers the modifications and variations of this invention provided they come within the scope of the appended claims and their equivalents.

What is claimed:

1. A method of fabricating a flexible hose (9) for a vacuum cleaner by winding at a predetermined angle one long extrusion molding band (7) provided with a semicircular portion (5) and an electric wire embedding portion (3) connected to each other through one connector (6) and bonding at the same time, the method comprising the steps of:
    (a) extruding a primary extrusion molding band (13) having a larger size than a size of a finished state while embedding an electric wire (1) in the primary extrusion molding band (13) at a first extruder (12), the larger size including at least two unequal thicknesses of the semicircular portion;
    (b) molding the primary extrusion molding band (13) into a multi-extrusion molding band (10) having the size of the finished state at a sizing mold (14); and
    (c) winding the multi-extrusion molding band (10) at a predetermined angle at a bonder and bonding a bonding portion (2) of the electric embedding portion (3) with a bonding end (4) of the semicircular portions (5) positioned on both sides of the multi-extrusion molding band (10) by using adhesive (8).

2. The method of claim 1, wherein the primary extrusion molding band (13) is extruded such that the plurality of semicircular portions (5) and the plurality of electric wires (3) are connected to each other through connectors (6) to form integrated cross-sections and an upper portion of the semicircular portion (5) is thinner than the connectors (6).

3. The method of claim 1, further comprising forming an expansion hole (11) at a portion where the semicircular portion (5) and an electric wire embedding portion (3) are connected to each other.

4. The method of claim 1, wherein molding the primary extrusion molding band (13) into a multi-extrusion molding band (10) includes making the at least two unequal thicknesses equal.

5. A method of fabricating a flexible hose (9) for a vacuum cleaner by winding at a predetermined angle one long extrusion molding band (7) provided with a semicircular portion (5) and an electric wire embedding portion (3) connected to each other through one connector (6) and bonding at the same time, the method comprising the steps of:

(a) extruding a primary extrusion molding band (13) having a larger size than a size of a finished state while embedding an electric wire (1) in the primary extrusion molding band (13) at a first extruder (12) wherein the primary extrusion molding band (13) is extruded such that the plurality of semicircular portions (5) and the plurality of electric wires (3) are connected to each other through connectors (6) to form integrated cross-sections and an upper portion of the semicircular portion (5) is thinner than the connectors (6);

(b) molding the primary extrusion molding band (13) into a multi-extrusion molding band (10) having the size of the finished state at a sizing mold (14); and (c) winding the multi-extrusion molding band (10) at a predetermined angle at a bonder and bonding a bonding portion (2) of the electric embedding portion (3) with a bonding end (4) of the semicircular portions (5) positioned on both sides of the multi-extrusion molding band (10) by using adhesive (8).

* * * * *